(12) United States Patent
Ihle et al.

(10) Patent No.: US 9,363,851 B2
(45) Date of Patent: Jun. 7, 2016

(54) HEATING DEVICE AND METHOD FOR MANUFACTURING THE HEATING DEVICE

(75) Inventors: Jan Ihle, Grambach (AT); Werner Kahr, Deutschlandsberg (AT)

(73) Assignee: EPCOS AG, Munich (DE)

( * ) Notice: Subject to any disclaimer, the term of this patent is extended or adjusted under 35 U.S.C. 154(b) by 320 days.

(21) Appl. No.: 13/057,938

(22) PCT Filed: Jul. 23, 2009

(86) PCT No.: PCT/EP2009/059519
§ 371 (c)(1),
(2), (4) Date: Apr. 7, 2011

(87) PCT Pub. No.: WO2010/015525
PCT Pub. Date: Feb. 11, 2010

(65) Prior Publication Data
US 2011/0174803 A1  Jul. 21, 2011

(30) Foreign Application Priority Data

Aug. 7, 2008  (DE) .................... 10 2008 036 835

(51) Int. Cl.
*H05B 3/10* (2006.01)
*H05B 3/14* (2006.01)
*C04B 35/468* (2006.01)
*H05B 3/42* (2006.01)

(52) U.S. Cl.
CPC ............ *H05B 3/141* (2013.01); *C04B 35/4682* (2013.01); *H05B 3/42* (2013.01); *C04B 2235/3213* (2013.01); *C04B 2235/3262* (2013.01); *H05B 2203/017* (2013.01); *H05B 2203/02* (2013.01); *Y10T 29/49083* (2015.01)

USPC ......................................... 219/553

(58) Field of Classification Search
USPC ............ 219/552, 553, 260; 29/611; 428/446, 428/450
See application file for complete search history.

(56) References Cited

U.S. PATENT DOCUMENTS

| 2,805,165 A | 9/1957 | Goodman |
| 3,044,968 A | 7/1962 | Ichikawa |
| 3,637,532 A | 1/1972 | Ramisch et al. |
| 3,996,168 A | 12/1976 | Hoffmann et al. |
| 4,017,715 A | 4/1977 | Whitney et al. |
| 4,035,613 A | 7/1977 | Sagawa et al. |
| 4,096,098 A | 6/1978 | Umeya et al. |
| 4,502,430 A * | 3/1985 | Yokoi et al. ............... 123/145 A |

(Continued)

FOREIGN PATENT DOCUMENTS

| CN | 1799286 | 7/2006 |
| DE | 929350 | 6/1955 |

(Continued)

OTHER PUBLICATIONS

International Search Report dated Nov. 17, 2009 in related U.S. Appl. No. 13/057,926.

(Continued)

*Primary Examiner* — Dana Ross
*Assistant Examiner* — Renee L Larose
(74) *Attorney, Agent, or Firm* — Cozen O'Connor

(57) ABSTRACT

A heating device is provided, comprising a shaped body, which has at least two regions comprising different compositions of a ceramic material with a positive temperature coefficient of electrical resistance. A method for manufacturing a heating device is furthermore specified.

17 Claims, 5 Drawing Sheets

(56) References Cited

U.S. PATENT DOCUMENTS

| | | | |
|---|---|---|---|
| 4,634,837 | A | 1/1987 | Ito et al. |
| 4,644,133 | A | 2/1987 | Atsumi et al. |
| 4,834,052 | A | 5/1989 | Hori et al. |
| 4,842,888 | A * | 6/1989 | Haluska et al. ............... 428/688 |
| 4,960,736 | A | 10/1990 | Luxzcz et al. |
| 5,721,062 | A | 2/1998 | Kobayashi |
| 5,736,095 | A * | 4/1998 | Shimada et al. ............. 264/614 |
| 5,756,215 | A * | 5/1998 | Sawamura et al. .......... 428/446 |
| 6,019,931 | A | 2/2000 | Kashiwagi |
| 6,071,465 | A | 6/2000 | Kobayashi |
| 6,144,286 | A * | 11/2000 | Moos et al. ................ 338/22 R |
| 6,147,330 | A | 11/2000 | Ikeda et al. |
| 6,396,028 | B1 | 5/2002 | Radmacher |
| 6,669,796 | B2 | 12/2003 | Tokuda et al. |
| 7,595,975 | B2 | 9/2009 | Suzuki et al. |
| 7,854,975 | B2 | 12/2010 | Fujii |
| 2002/0013213 | A1 | 1/2002 | Sato et al. |
| 2002/0054932 | A1 | 5/2002 | Gellert et al. |
| 2002/0130318 | A1 | 9/2002 | Kodama et al. |
| 2005/0154110 | A1 | 7/2005 | Takaya et al. |
| 2006/0182908 | A1 | 8/2006 | Fujii |
| 2007/0069426 | A1 | 3/2007 | Kurita et al. |
| 2007/0194016 | A1 * | 8/2007 | Dalton ......................... 219/759 |
| 2007/0295708 | A1 | 12/2007 | Yu et al. |
| 2008/0078493 | A1 | 4/2008 | Wei et al. |
| 2009/0146042 | A1 | 6/2009 | Ihle et al. |

FOREIGN PATENT DOCUMENTS

| | | |
|---|---|---|
| DE | 1465439 | 7/1973 |
| DE | 2552127 | 2/1977 |
| DE | 2753766 | 12/1977 |
| DE | 3820918 | 6/1988 |
| DE | 68910231 | 3/1994 |
| DE | 4340346 | 6/1995 |
| DE | 4414284 | 10/1995 |
| DE | 19818375 | 4/1998 |
| DE | 19739758 | 6/1999 |
| DE | 10012675 | 9/2001 |
| DE | 10315220 | 10/2004 |
| DE | 10 2005 040685 | 3/2007 |
| EP | 0356244 | 10/1993 |
| EP | 0635993 | 1/1995 |
| EP | 2 322 012 | 5/2011 |
| GB | 714965 | 9/1954 |
| JP | 55146905 | 11/1980 |
| JP | 55-165602 | 12/1980 |
| JP | 60-014784 | 1/1985 |
| JP | 60-216484 | 1/1985 |
| JP | 60-86788 | 5/1985 |
| JP | 03-054165 | 10/1985 |
| JP | 64-068419 | 3/1989 |
| JP | 64-68419 | 3/1989 |
| JP | H02-97461 | 4/1990 |
| JP | 02-278686 | 11/1990 |
| JP | 03-257785 | 11/1991 |
| JP | 04-042501 | 2/1992 |
| JP | 04-206803 | 7/1992 |
| JP | 04-233701 | 8/1992 |
| JP | H04-247602 | 9/1992 |
| JP | 05152057 | 6/1993 |
| JP | 05-251206 | 9/1993 |
| JP | H06-5181 | 1/1994 |
| JP | 07-106055 | 4/1995 |
| JP | 09-180907 | 7/1997 |
| JP | 10-101413 | 4/1998 |
| JP | 10-222005 | 8/1998 |
| JP | 10-276826 | 10/1998 |
| JP | 2003-181326 | 7/2003 |
| JP | 2009-535789 | 10/2009 |
| WO | WO 01/58212 | 8/2001 |
| WO | WO 2007/130658 | 11/2007 |
| WO | WO 2010/015525 | 2/2010 |

OTHER PUBLICATIONS

E. Andrich, PTC-Thermistoren als selbstregelnde Heizelemente, *Philips Technische Rundschau*, 192-200 (1969).

International Search Report dated Sep. 25, 2009.

Office Action dated Jan. 8, 2014 issued in the corresponding Japanese Patent Application No. 2011-521520.

Office Action dated Jun. 26, 2014 issued in the corresponding Japanese Patent Application No. 2011-521523.

* cited by examiner

HEATING DEVICE AND METHOD FOR MANUFACTURING THE HEATING DEVICE

PRIORITY CLAIM

This is a U.S. national stage of application No. PCT/EP2009/059519, filed on Jul. 23, 2009. Priority is claimed on the following application: Germany Application No.: 10 2008 036 835.0 filed on Aug. 7, 2008, the content of which is incorporated here by reference.

The invention relates to a heating device and a method for manufacturing a heating device.

BACKGROUND OF THE INVENTION

Media, for example fluids, can be heated by means of a thermal contact with materials having a positive temperature coefficient of electrical resistance (PTC materials). Hitherto, such PTC materials have been able to be shaped as disks or rectangular elements which consist of a single PTC material. Such disks or rectangular elements cannot be integrated at regions which are structurally difficult to access. As a result, short heating times and low heating powers cannot be realized since the disks or rectangular elements cannot be fitted where the heat is required.

SUMMARY OF THE INVENTION

One object to be achieved consists in providing a heating device having a high efficiency. This object is achieved by means of a heating device in accordance with patent claim 1. Further patent claims relate to further embodiments of the device and to a method for manufacturing a heating device.

In accordance with one embodiment, a heating device is provided, comprising a shaped body, which contains a ceramic material with a positive temperature coefficient of electrical resistance. In this case, the shaped body comprises at least one first region and one second region, wherein the first region comprises a ceramic material of a first composition and the second region comprises a ceramic material of a second composition, which is different from the first composition.

A heating device containing a shaped body comprising at least two ceramic materials of different compositions is thus provided. As a result of the use of ceramic materials with a positive temperature coefficient of electrical resistance, a shaped body is provided which is heated by application of a voltage and can emit this heat to the surroundings. In this case, the shaped body has a self-regulating behavior. If the temperature in the shaped body reaches a critical value, the resistance in the shaped body also rises, such that less current flows through the shaped body. Further heating of the shaped body is thus prevented, as a result of which no additional electronic regulation of the heating power need be provided.

The use of at least two different ceramic materials in a shaped body makes it possible to obtain different heating properties in one shaped body. By way of example, the first region can have a slow heating behavior, while the second region exhibits a fast heating behavior. The maximum heating temperature can also be different in the two regions.

Furthermore, the shaped body can be produced by means of injection molding and thus be shaped in any geometrical form that is required for the respective structural environment. Such a heating device can therefore also be arranged at regions that are structurally difficult to access. Consequently, a medium can be heated efficiently with very short heating times and low heating powers.

The use of a single shaped body having at least two regions having different heating properties makes it possible to avoid a situation in which a plurality of components have to be joined together and fixed to one another. In the shaped body different functions are already predetermined by the different regions, which merge with one another without interruption.

The medium to be heated is heated to a different extent or at a different speed, depending on the region by which it is heated. Consequently, by way of example, stepwise heating can be realized if a medium is guided past along the different regions of the shaped body.

The first and second compositions of the ceramic material can comprise a material and/or stoichiometric composition. The compositions can therefore vary only in terms of their material composition or only in terms of their stoichiometric composition or in terms of their material composition and in terms of their stoichiometric composition. At all events, the compositions of the materials are different from one another and can have different properties.

The first region and the second region of the shaped body can have mutually different thermal and/or electrical properties. By way of example, given identical electrical properties, the regions can have different heating rates and different maximum temperatures to be achieved. On the other hand, the regions can have different resistances, for example, at a given temperature. All these properties mentioned can also be different from one another in the two regions. The linkage of the thermal and electrical properties of a ceramic material is clarified in a resistivity-temperature characteristic curve of the material, the profile of which represents the thermal properties as a function of the electrical resistivity.

A shaped body is thus provided which has locally different functions in at least two regions on account of the electrical and thermal properties of the ceramic materials present there. By way of example, it is thus possible to obtain varying temperature distributions in the shaped body.

The ceramic material can have a structure having the formula $Ba_{1-x-y}M_xD_yTi_{1-a-b}N_aMn_bO_3$. In this case, x comprises the range 0 to 0.5, y comprises the range 0 to 0.01, a comprises the range 0 to 0.01, b comprises the range 0 to 0.01, M comprises a divalent cation, D comprises a trivalent or tetravalent donor, and N comprises a pentavalent or hexavalent cation. This structure has a perovskite structure. M can be, for example, calcium, strontium or lead, D can be, for example, yttrium or lanthanum, and examples of N are niobium or antimony. The shaped body can comprise metallic impurities present with a content of less than 10 ppm. The content of metallic impurities is so low that the PTC properties of the shaped body are not influenced.

The first region and the second region of the shaped body can have a Curie temperature comprising a range of −30° C. to 340° C. Furthermore, the first region and the second region of the shaped body can have a resistivity at 25° C. which lies in a range of 3 Ωcm to 100 000 Ωcm.

The first region and the second region of the shaped body can have identical Curie temperatures and mutually different resistivities at 25° C., or identical resistivities at 25° C. and mutually different Curie temperatures, or mutually different Curie temperatures and mutually different resistivities at 25° C. Consequently, the two regions of the shaped body have different heating properties, either on account of different electrical properties or on account of different thermal properties or on account of different electrical and thermal properties. An adaptation of the heating power for a stepwise optimum heat transfer to the medium to be heated can be realized by virtue of the possible locally different heating properties of the shaped body.

An interface region can be present between the first region and the second region, in which interface region the ceramic material of the first region and the ceramic material of the second region are sintered together.

The heating device can furthermore have electrical contact-connections for generating a current flow through the shaped body. These contact-connections can be arranged on the shaped body and comprise electrodes which are fitted to the shaped body and which are electrically conductively connected to external electrical contacts.

The contact-connections can be arranged at the shaped body in such a way that current flows through each region of the shaped body. Heat is thus generated in each region of the shaped body by virtue of the PTC properties of the ceramic materials.

Each contact-connection can make contact with each of the at least two regions of the shaped body. By way of example, two regions of the shaped body which are arranged alongside one another can have, on two sides lying opposite one another, electrical contact-connections which in each case make contact with both regions. This produces a gradient of the thermal and electrical properties in the regions of the shaped body which runs parallel to the plane of the electrical contact-connections.

Furthermore, the regions can be arranged alongside one another and each region can be contact-connected by in each case two contact-connections on opposite sides. A parallel connection of the regions can thus be realized.

Furthermore, the regions of the shaped body can be arranged between the contact-connections in such a way that each contact-connection makes contact with a different region. By way of example, two regions arranged one above the other can be contact-connected by a first and a second electrical contact-connection, wherein the first contact-connection makes contact with the first region and the second contact-connection makes contact with the second region. At the same time, the two contact-connections can lie opposite one another. Consequently, a series connection of the regions is realized and a gradient of the thermal and electrical properties in the shaped body which runs perpendicularly to the plane of the electrical contact-connections is produced. It is also possible for three or more regions of the shaped body having different electrical and thermal properties to be arranged one above another, wherein only the two outer regions are contact-connected by electrical contact-connections, such that a current flow is generated through all regions.

The shaped body can be shaped in such a way that a medium, for example a fluid, flows through it. The shaped body can then be shaped for example in the form of a pipe or nozzle. Furthermore, it is also possible for a medium to flow around the shaped body and for the latter to be shaped in any other geometrical forms.

If the shaped body is shaped as a nozzle, that is to say as a pipe with a tapered portion at one end, the nozzle can have different regions having different electrical and/or thermal properties, such that a medium conducted through the nozzle flows through said regions successively and can thus be heated in a stepwise manner. Said regions can be arranged one behind another along the longitudinal axis of the pipe or one above another perpendicularly to the longitudinal axis.

The shaped body can be surrounded by a passivation layer in large- or whole-area fashion. The passivation layer can comprise a material selected from glass, plastic, silicone or a ceramic material different than the ceramic material of the shaped body. Direct contact between the shaped body and the medium to be heated is thus prevented. It is thus possible to prevent the shaped body from being corrosively attacked by the medium to be heated or from being dissolved by the medium. Furthermore, the medium to be heated is prevented from being contaminated by the material of the shaped body.

Furthermore, a method for manufacturing a heating device is provided, comprising the following method steps:

A) injection-molding a green body,

B) sintering the green body in order to produce a shaped body,

C) arranging electrical contact-connections on the shaped body.

In this case, at least two mutually different ceramic materials having a positive temperature coefficient of electrical resistance are injection-molded successively in method step A). A green body having at least two regions comprising ceramic materials is thus produced in a single method step. Said green body is then sintered in the further method step B) to form a shaped body having two regions having different heating properties.

Furthermore, in method step A), for the production of the green body, a ceramic starting material is provided which comprises a ceramic filling material having the structure $Ba_{1-x-y}M_xD_yTi_{1-a-b}N_aMn_bO_3$ and a matrix.

In order to produce the ceramic starting material with metallic impurities amounting to less than 10 ppm, it can be produced using tools which have a hard coating in order to avoid abrasion. A hard coating can consist of tungsten carbide, for example. All surfaces of the tools which come into contact with the ceramic material can be coated with the hard coating.

In this way, a ceramic filling material that can be converted into a ceramic PTC material by sintering can be mixed with a matrix and processed to form granules. Said granules can be injection-molded for further processing.

The matrix into which the ceramic filling material is incorporated and which has a lower melting point than the ceramic material can in this case have a proportion of less than 20% by mass relative to the ceramic material. The matrix can comprise a material selected from a group comprising wax, resins, thermoplastics and water-soluble polymers. Further additives such as antioxidants or plasticizers can likewise be present.

Method step A) can comprise the steps of:

A1) providing the ceramic starting material,

A2) injection-molding the starting material into a shape, and

A3) removing the matrix.

During sintering in method step B), the ceramic starting material is converted into the material of the shaped body having a positive temperature coefficient of electrical resistance.

In method step B), an interface region is formed between the at least two different materials, in which interface region the different ceramic materials are sintered together and thus form solid solutions. The interface region can have a thickness of 1 micrometer to 200 micrometers, wherein the thickness is dependent on the choice of materials. A total mixing of the two materials is avoided. Furthermore, the interface region in which the ceramic materials are sintered together serves to connect the regions of the shaped body to one another, thereby realizing a continuous transition between the regions and hence a monolithic shaped body. Additional fixings between the regions are therefore not necessary.

The invention will be explained in even greater detail on the basis of the figures and exemplary embodiments.

DETAILED DESCRIPTION OF THE PRESENTLY PREFERRED EMBODIMENTS

Figure 1:
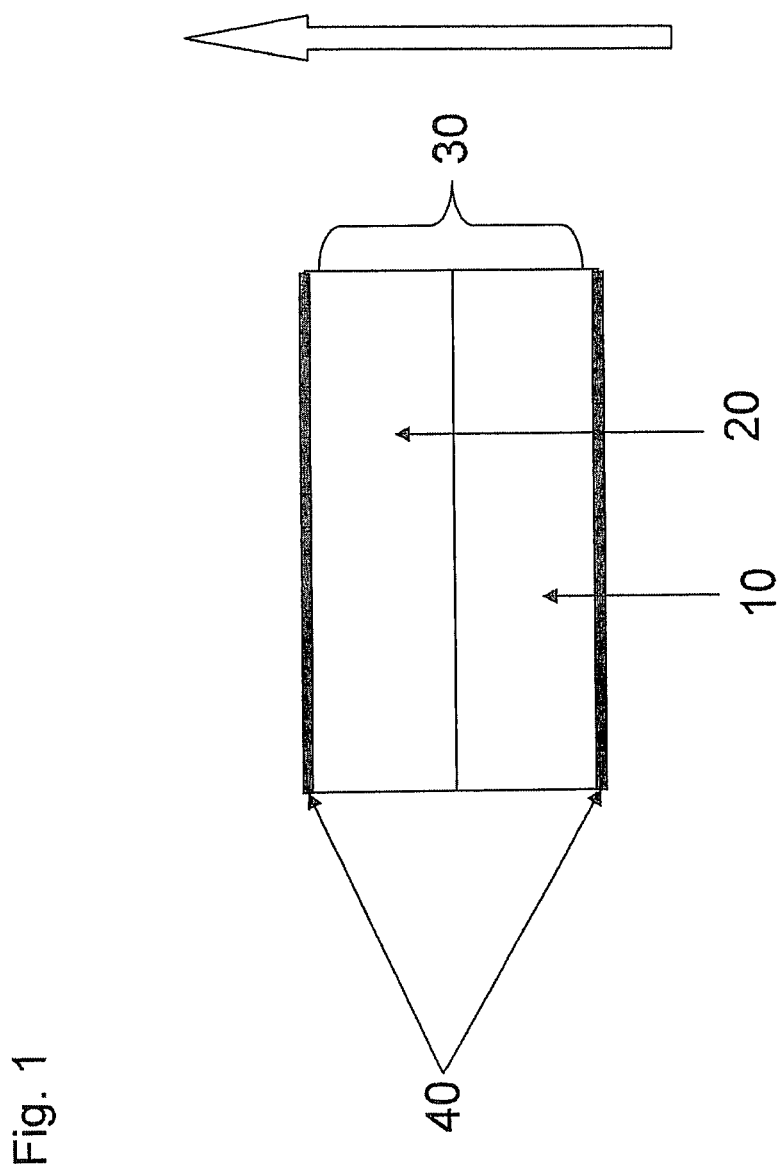
FIG. 1 shows the schematic side view of a first embodiment of the heating device.

FIG. 1 shows the schematic side view of a first embodiment of the heating device. In this case, a first region 10 and a second region 20 of a shaped body 30 are arranged one above the other. Both regions comprise ceramic materials with a positive temperature coefficient of electrical resistance having the structure $Ba_{1-x-y}M_xD_yTi_{1-a-b}N_aMn_bO_3$, wherein the compositions of the ceramic materials in the regions are different.

An electrical contact-connection 40 is arranged on the region 10 and a further electrical contact-connection 40 is arranged on the region 20. Consequently, each region is contact-connected by a different electrical contact-connection. This arrangement of the regions in the shaped body 30 gives rise, in the shaped body, to a gradient of the electrical and/or thermal properties which runs perpendicularly to the plane of the contact-connections. This is indicated schematically by an arrow. The different electrical and/or thermal properties such as, for example, the Curie temperature or the resistivity at 25° C. of the regions 10 and 20 are produced by different compositions of the ceramic materials in the two regions. It is conceivable for even further regions having further compositions different than those of the regions 10 and 20 to be present between or above and/or below said regions 10 and 20 (not shown here).

Figure 2:
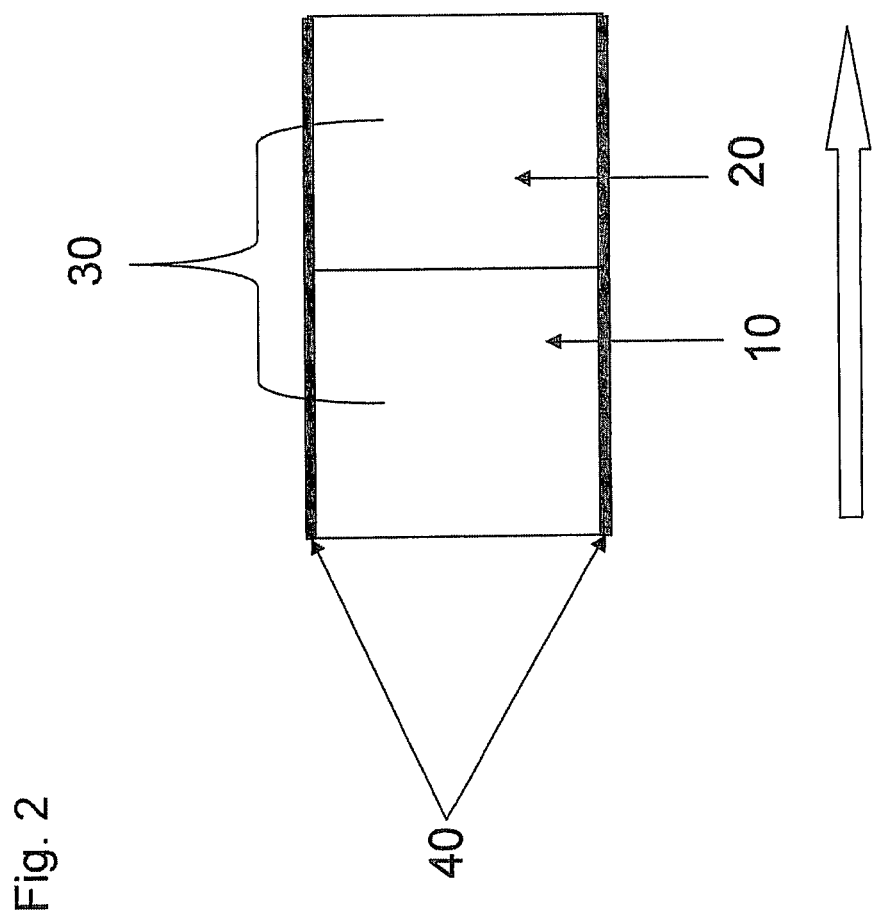
FIG. 2 shows the schematic side view of a second embodiment of the heating device.

FIG. 2 shows the schematic side view of a further embodiment of the heating device. In this case, a region 10 is arranged alongside a region 20, and the electrical contact-connections in each case make contact with both regions and are arranged on opposite sides of the shaped body. A gradient of the thermal and/or electrical properties which runs parallel to the plane of the electrical contact-connections 40 is thus produced in the shaped body 30. This is indicated by an arrow. Alongside the regions 10 and 20 further regions of the shaped body can be present which are arranged alongside the regions 10 and 20 and are contact-connected by the electrical contact-connections 40 (not shown here).

Figure 3:
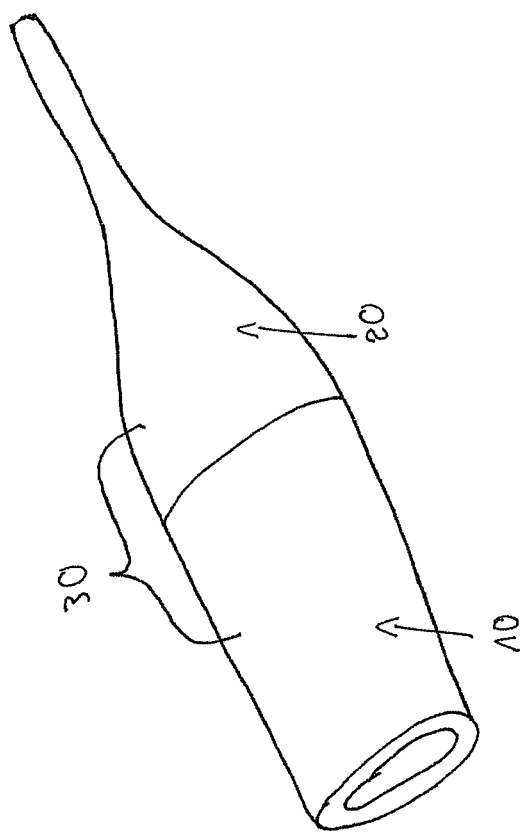
FIG. 3 shows the schematic perspective view of one embodiment of the heating device.

FIG. 3 shows the perspective, schematic side view of one exemplary embodiment of a heating device. Here, the shaped body is shaped as a nozzle having the regions 10 and 20, which are arranged one behind the other in the longitudinal direction of the nozzle. For the sake of clarity, the electrical contact-connections 40 are not shown here. They can be fitted for example on the surface of the shaped body, at the outer and inner sides of the nozzle, or at the end sides of said shaped body. If a medium to be heated is then conducted through the nozzle, for example the region 10 could lead to a preheating of the medium and the region 20 could heat the medium to the desired end temperature. Stepwise heating of a medium by a shaped body having different regions is thus conceivable. In this case, too, further regions can be present alongside the two regions 10 and 20 in order to produce a finer tuning of the heating temperatures.

Figure 4:
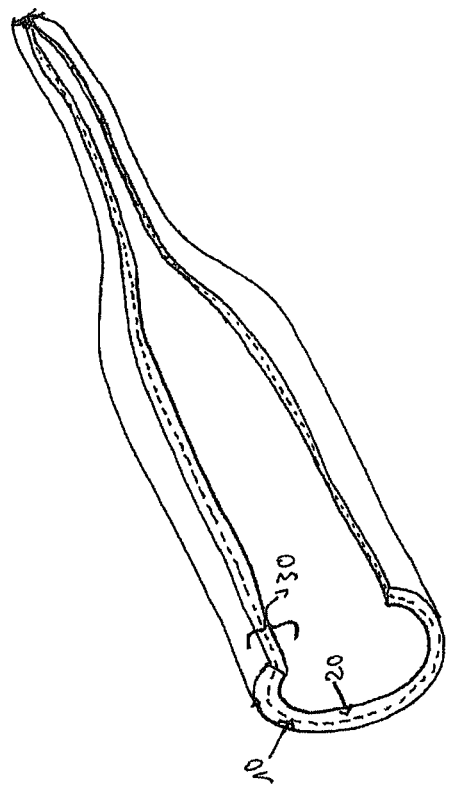
FIG. 4 shows the schematic perspective view of a further embodiment of the heating device.

FIG. 4 shows a further perspective schematic side view of an embodiment of the heating device. In this case, too, the shaped body is shaped as a nozzle. Part of the nozzle in the front region is omitted for clarification purposes in the illustration. The regions 10 and 20 are in this case arranged in such a way that a medium to be heated which is conducted through the nozzle comes into contact only with one of the regions, while the other region is arranged on the outer side of the nozzle. In this case it could be expedient, for example, to choose the material for the region 10 such that only a low degree of heating is produced by application of the voltage, while a high degree of heating is produced in the region 20. Consequently, a high degree of heating of the shaped body is brought about only in the region which is closer to the medium to be heated. In this exemplary embodiment, the electrodes 40 (not shown here) can be arranged for example on the inner surface and on the outer surface of the nozzle.

Figure 5:
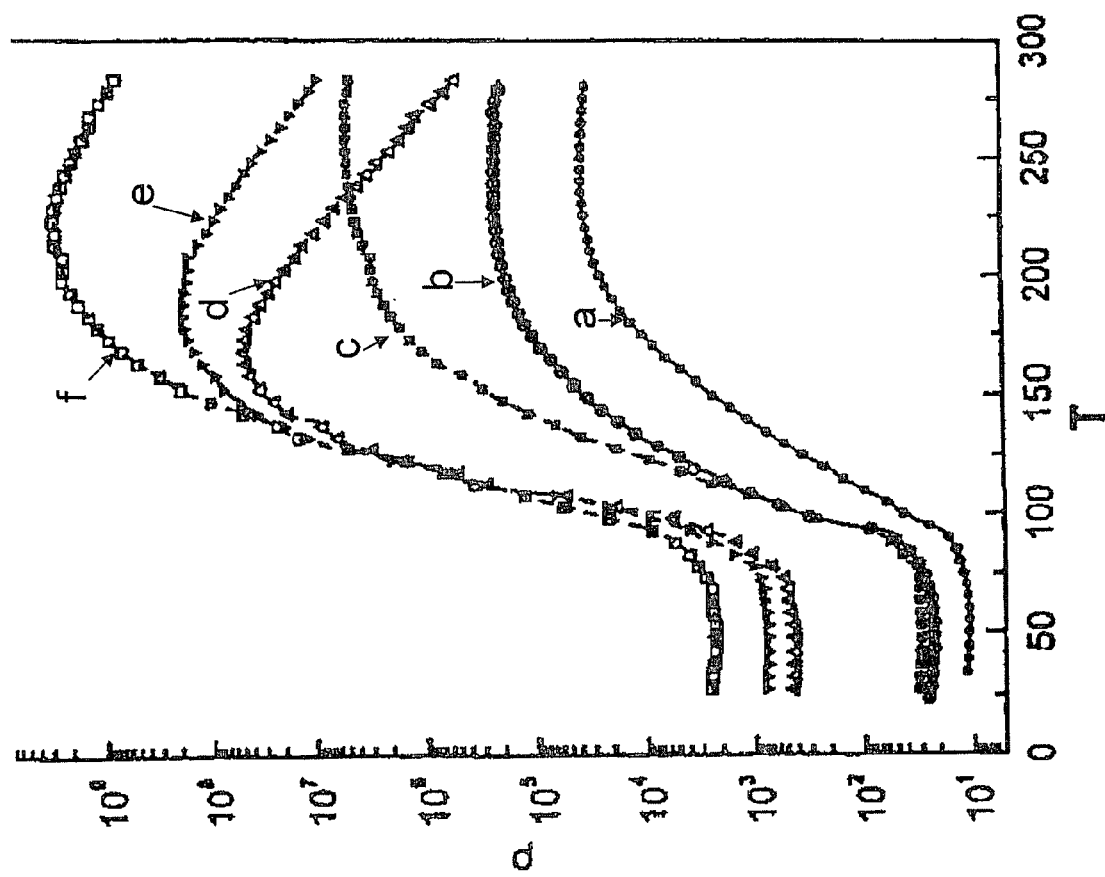
FIG. 5 shows resistivity-temperature characteristic curves of ceramic materials.

In order to clarify the electrical and thermal properties and their dependence on one another, FIG. 5 shows the resistivity-temperature characteristic curves (RT characteristic curve) of a ceramic material having different degrees of dopings. The temperature T in ° C. is plotted against the resistivity $\rho$ in $\Omega$cm. The ceramic material is $Ba_{0.9}Sr_{0.1}TiO_3$, which is not doped (curve a), and is doped with 0.02% (curve b), 0.04% (curve c), 0.06% (curve d), 0.08% (curve e) and 0.1% (curve f) Mn. The higher the doping in the ceramic material, the higher the resistivity $\rho$ at temperatures below the temperature range in which the resistivity rises in a temperature-dependent manner, and at temperatures above the temperature range in which the resistivity rises in a temperature-dependent manner.

The embodiments shown in the figures can be varied in any desired manner. It should furthermore be taken into account that the invention is not restricted to the examples, but rather permits further configurations not presented here.

LIST OF REFERENCE SYMBOLS

10 First region
20 Second region
30 Shaped body
40 Electrical contact-connection
T Temperature
$\rho$ Resistivity
a RT characteristic curve of undoped $Ba_{0.9}Sr_{0.1}TiO_3$
b RT characteristic curve of $Ba_{0.9}Sr_{0.1}TiO_3$ doped with 0.02% Mn
c RT characteristic curve of $Ba_{0.9}Sr_{0.1}TiO_3$ doped with 0.04% Mn
d RT characteristic curve of $Ba_{0.9}Sr_{0.1}TiO_3$ doped with 0.06% Mn
e RT characteristic curve of $Ba_{0.9}Sr_{0.1}TiO_3$ doped with 0.08% Mn
f RT characteristic curve of $Ba_{0.9}Sr_{0.1}TiO_3$ doped with 0.1% Mn

The invention claimed is:

1. A heating device, comprising a shaped body and electrical contact-connections for generating a current flow through the shaped body, wherein the shaped body comprises at least one first region and one second region, wherein the first region comprises a ceramic material of a first composition with a positive temperature coefficient of electrical resistance and the second region comprises a ceramic material of a second composition with a positive temperature coefficient of electrical resistance, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the first region and the second region are connected by an interface region.

2. The heating device according to claim 1, wherein the first and second compositions of the ceramic material comprise one of material compositions, stoichiometric compositions, and material and stoichiometric compositions.

3. The heating device according to claim 1, wherein the first region and the second region of the shaped body have one of mutually different thermal properties, mutually different electrical properties, and mutually different thermal and electrical properties.

4. The heating device according to claim 1, wherein the ceramic material comprises the structure $Ba_{1-x-y}M_xD_yTi_{1-a-b}N_aMn_bO_3$, where x=0 to 0.5, y=0 to 0.01, a=0 to 0.01, b=0 to 0.01, M comprises a divalent cation, D comprises a trivalent or tetravalent donor, and N comprises a pentavalent or hexavalent cation.

5. The heating device according to claim 1, wherein the first region and the second region of the shaped body have a resistivity at 25° C. which lies in a range of 3 Ωcm to 100 000 Ωcm.

6. The heating device according to claim 1, wherein the first region and the second region of the shaped body have identical Curie temperatures and mutually different resistivities at 25° C., or identical resistivities at 25° C. and mutually different Curie temperatures, or mutually different Curie temperatures and mutually different resistivities at 25° C.

7. The heating device according to the claim 1, wherein the contact-connections are arranged at the shaped body in such a way that current flows through each region of the shaped body.

8. The heating device according to claim 1, wherein each contact-connection makes contact with each of the at least two regions of the shaped body.

9. The heating device according to claim 1, wherein the regions of the shaped body are arranged between the contact-connections in such a way that each contact-connection makes contact with a different region.

10. The heating device according to claim 1, wherein the shaped body is shaped as a nozzle.

11. The heating device according to claim 1, wherein a passivation layer is arranged on the shaped body.

12. A method for manufacturing a heating device comprising a shaped body and electrical contact-connections for generating a current flow through the shaped body, wherein the shaped body comprises at least one first region and one second region, wherein the first region comprises a ceramic material of a first composition with a positive temperature coefficient of electrical resistance and the second region comprises a ceramic material of a second composition with a positive temperature coefficient of electrical resistance, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the first region and the second region are connected by an interface region, the method comprising the following steps:
A) injection-molding a green body,
B) sintering the green body in order to produce a shaped body, and
C) arranging electrical contact-connections on the shaped body, wherein at least two mutually different ceramic materials having a positive temperature coefficient of electrical resistance are injection-molded successively in the step A).

13. The method according to claim 12, wherein, in the step B), an interface region is formed between the at least two different materials, in which interface region the ceramic materials are sintered together.

14. A heating device, comprising a shaped body and electrical contact-connections for generating a current flow through the shaped body, wherein the shaped body contains a ceramic material with a positive temperature coefficient of electrical resistance and comprises at least one first region and one second region, wherein the first region comprises a ceramic material of a first composition and the second region comprises a ceramic material of a second composition, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the first and second compositions of the ceramic material comprise one of material compositions, stoichiometric compositions, and material and stoichiometric compositions.

15. A heating device, comprising a shaped body and electrical contact-connections for generating a current flow through the shaped body, wherein the shaped body contains a ceramic material with a positive temperature coefficient of electrical resistance and comprises at least one first region and one second region, wherein the first region comprises a ceramic material of a first composition and the second region comprises a ceramic material of a second composition, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the ceramic material comprises the structure $Ba_{1-x-y}M_xD_yTi_{1-a-b}N_aMn_bO_3$, where x=0 to 0.5, y=0 to 0.01, a=0 to 0.01, b=0 to 0.01, M comprises a divalent cation, D comprises a trivalent or tetravalent donor, and N comprises a pentavalent or hexavalent cation.

16. A heating device, comprising a shaped body and electrical contact-connections for generating a current flow through the shaped body, wherein the shaped body contains a ceramic material with a positive temperature coefficient of electrical resistance and comprises at least one first region and one second region, wherein the first region comprises a ceramic material of a first composition and the second region comprises a ceramic material of a second composition, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the regions of the shaped body are arranged between the contact-connections in such a way that each contact-connection makes contact with a different region.

17. A heating device, comprising a shaped body and electrical contact-connections for generating a current flow through the shaped body, wherein the shaped body contains a ceramic material with a positive temperature coefficient of electrical resistance and comprises at least one first region and one second region, wherein the first region comprises a ceramic material of a first composition and the second region comprises a ceramic material of a second composition, which is different from the first composition so that a gradient of the electrical and/or thermal properties is present across the shaped body, the gradient either running perpendicular or parallel to the plane of the electrical contact connections and wherein the first region and the second region of the shaped body have a Curie temperature which comprises a range of −30° C. to 340° C., and wherein the first region and the second region of the shaped body have identical Curie temperatures and mutually different resistivities at 25° C., or identical resistivities at 25° C. and mutually different Curie temperatures, or mutually different Curie temperatures and mutually different resistivities at 25° C.

* * * * *